(12) United States Patent
Singh

(10) Patent No.: US 10,372,977 B2
(45) Date of Patent: Aug. 6, 2019

(54) VIDEO PROCESSING FOR HUMAN OCCUPANCY DETECTION

(71) Applicant: ANALOG DEVICES GLOBAL UNLIMITED COMPANY, Hamilton (BM)

(72) Inventor: Raka Singh, Bangalore (IN)

(73) Assignee: ANALOG DEVICES GLOVAL UNLIMITED COMPANY, Hamilton (BM)

( * ) Notice: Subject to any disclaimer, the term of this patent is extended or adjusted under 35 U.S.C. 154(b) by 530 days.

(21) Appl. No.: 14/794,991

(22) Filed: Jul. 9, 2015

(65) Prior Publication Data

US 2017/0011261 A1 Jan. 12, 2017

(51) Int. Cl.
*G06K 9/00* (2006.01)
(52) U.S. Cl.
CPC ..... *G06K 9/00369* (2013.01); *G06K 9/00771* (2013.01); *G06K 9/00832* (2013.01);
(Continued)

(58) Field of Classification Search
None
See application file for complete search history.

(56) References Cited

U.S. PATENT DOCUMENTS 6,721,461 B1 * 4/2004 Nichani ................... G06K 9/38
382/145
6,909,921 B1 6/2005 Bilger
(Continued)

FOREIGN PATENT DOCUMENTS

AT 14229 6/2015
CN 104217419 12/2014
(Continued)

OTHER PUBLICATIONS

Search Report and Written Opinion issued in PCT Patent Application Serial No. PCT/EP2016/066327 dated Nov. 7, 2016, 14 pages.
(Continued)

*Primary Examiner* — Matthew C Bella
*Assistant Examiner* — Brian D Shin
(74) *Attorney, Agent, or Firm* — Patent Capital Group

(57) ABSTRACT

Many conventional video processing algorithms attempting to detect human presence in a video stream often generate false positives on non-human movements such as plants moving in the wind, rotating fan, etc. To reduce false positives, a technique exploiting temporal correlation of non-human movements can accurately detect human occupancy while reject non-human movements. Specifically, the technique involves performing temporal analysis on a time-series signal generated based on an accumulation of foreground maps and an accumulation of motion map and analyzing the running mean and the running variance of the time-series signal. By determining whether the time-series signal is correlated in time, the technique is able to distinguish human movements and non-human movements. Besides having superior accuracy, the technique lends itself to an efficient algorithm which can be implemented on low cost, low power digital signal processor or other suitable hardware.

25 Claims, 13 Drawing Sheets

(52) U.S. Cl.
CPC ............... *G06T 2207/10016* (2013.01); *G06T 2207/30196* (2013.01)

(56) References Cited

U.S. PATENT DOCUMENTS

| | | |
|---|---|---|
| 7,499,569 B2 | 3/2009 | Sato et al. |
| 8,334,906 B2 | 12/2012 | Lipton et al. |
| 9,495,600 B2 | 11/2016 | Heu et al. |
| 9,992,847 B2 | 5/2018 | Zeidler |
| 2002/0030739 A1* | 3/2002 | Nagaya ................ F41G 7/2226 348/143 |
| 2003/0123704 A1 | 7/2003 | Farmer et al. |
| 2003/0133595 A1 | 7/2003 | Farmer et al. |
| 2003/0209893 A1 | 11/2003 | Breed et al. |
| 2007/0127774 A1* | 6/2007 | Zhang ................ G06K 9/00771 382/103 |
| 2007/0285510 A1 | 12/2007 | Lipton et al. |
| 2009/0041297 A1 | 2/2009 | Zhang et al. |
| 2010/0046797 A1* | 2/2010 | Strat ................ G06K 9/00778 382/103 |
| 2010/0290710 A1* | 11/2010 | Gagvani ............ G06K 9/00543 382/224 |
| 2011/0115910 A1 | 5/2011 | Brackney |
| 2011/0317009 A1* | 12/2011 | Kumaraswamy .. G06K 9/00744 348/143 |
| 2012/0219210 A1* | 8/2012 | Ding .................... G06K 9/4642 382/159 |
| 2012/0288153 A1* | 11/2012 | Tojo ...................... G06T 7/0081 382/103 |
| 2013/0182905 A1 | 7/2013 | Myers et al. |
| 2013/0342636 A1 | 12/2013 | Tian |

FOREIGN PATENT DOCUMENTS

| | | |
|---|---|---|
| DE | 102014201652 | 7/2015 |
| EP | 1865755 | 6/2007 |
| EP | 3100594 | 1/2015 |
| JP | 2005-0242694 | 9/2005 |
| KR | 20140141034 | 10/2014 |
| WO | 1998-0048372 | 10/1998 |
| WO | 2015/114085 | 8/2015 |

OTHER PUBLICATIONS

Zhong Zhang et al., "A Robust Human Detection and Tracking System Using a Human-Model-Based Camera Calibration", The Eighth International Workshop on Visual Surveillance—VS2008, Oct. 2008, Marseille, France. <inria-00325644>, HAL archives-ouvertes.fr, 9 pages.

Neeti A. Ogale, "A Survey of Techniques for Human Detection From Video", Department of Computer Science, University of Maryland, College Park, MD 20742, 2006, 15 pages.

Ivan Laptev et al., "Local Velocity-Adapted Motion Events for Spatio-Temporal Recognition", Computer Vision and Image Understanding 108 (2007) pp. 207-229, www.elsevier.com/locate/cviu, 23 pages.

Guo Jing et al., "Foreground Motion Detection by Difference-Based Spatial Temporal Entropy Image", School of Computer Engineering, Nanyang Technological University, Singapore 639798, 0-7803-8560-8/04/$20.00 © 2004 IEEE, 4 pages.

Hongying Meng et al., "Chapter 7—Motion History Histograms for Human Action Recognition", University of Lincoln, Lincoln, UK, http://link.springer.com/chapter/10.1007%2F978-1-84800-304-0_7, 2009, pp. 139-162, 24 pages.

* cited by examiner

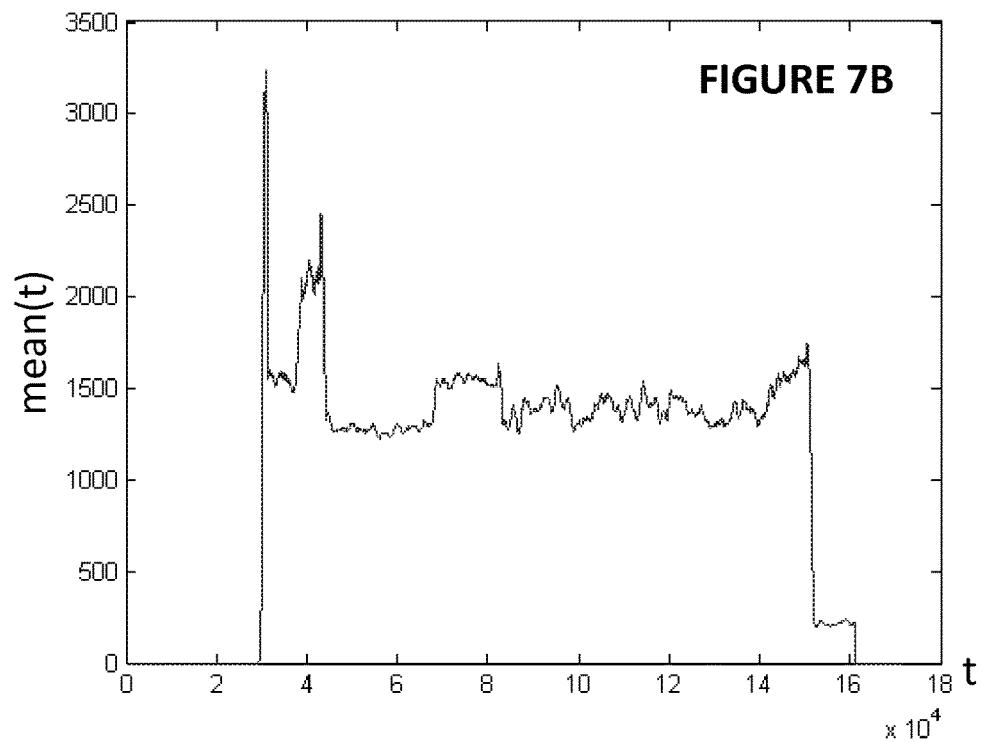
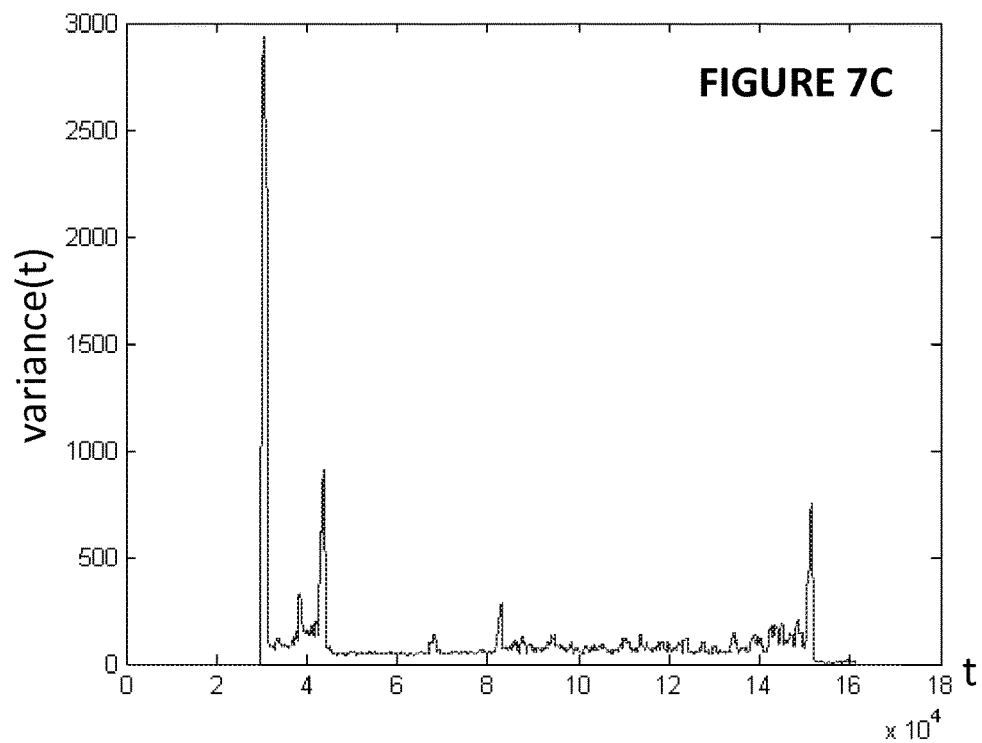

↔ HUMAN OCCUPANCY

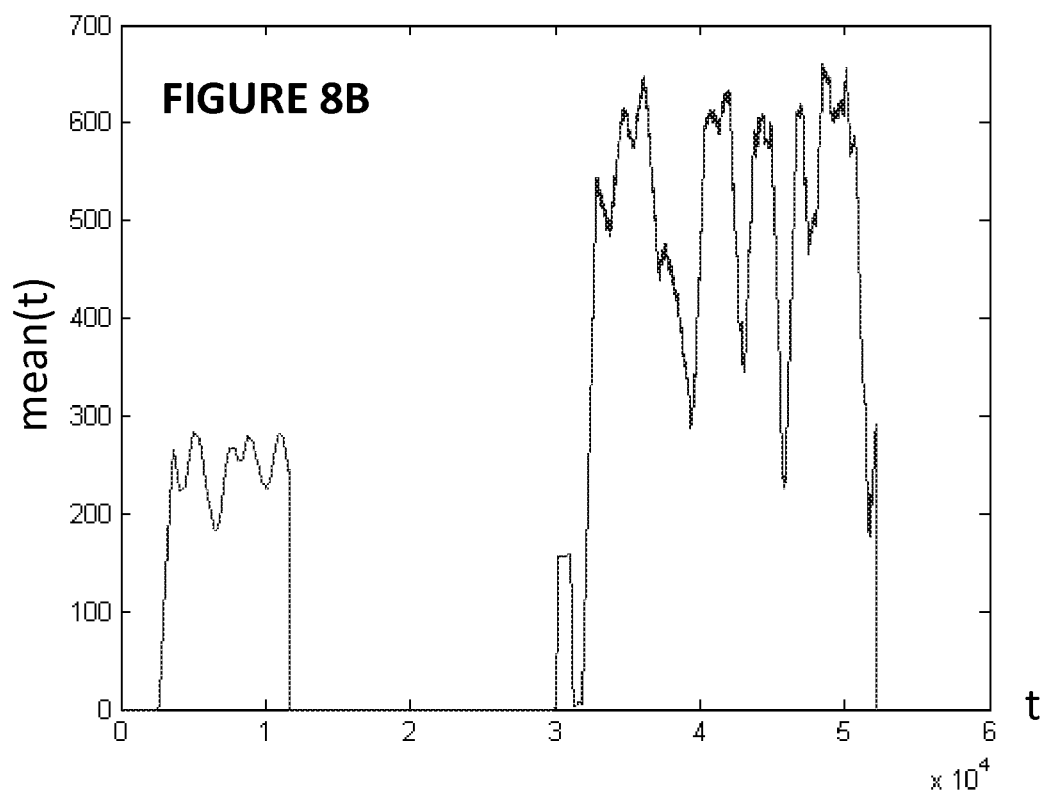
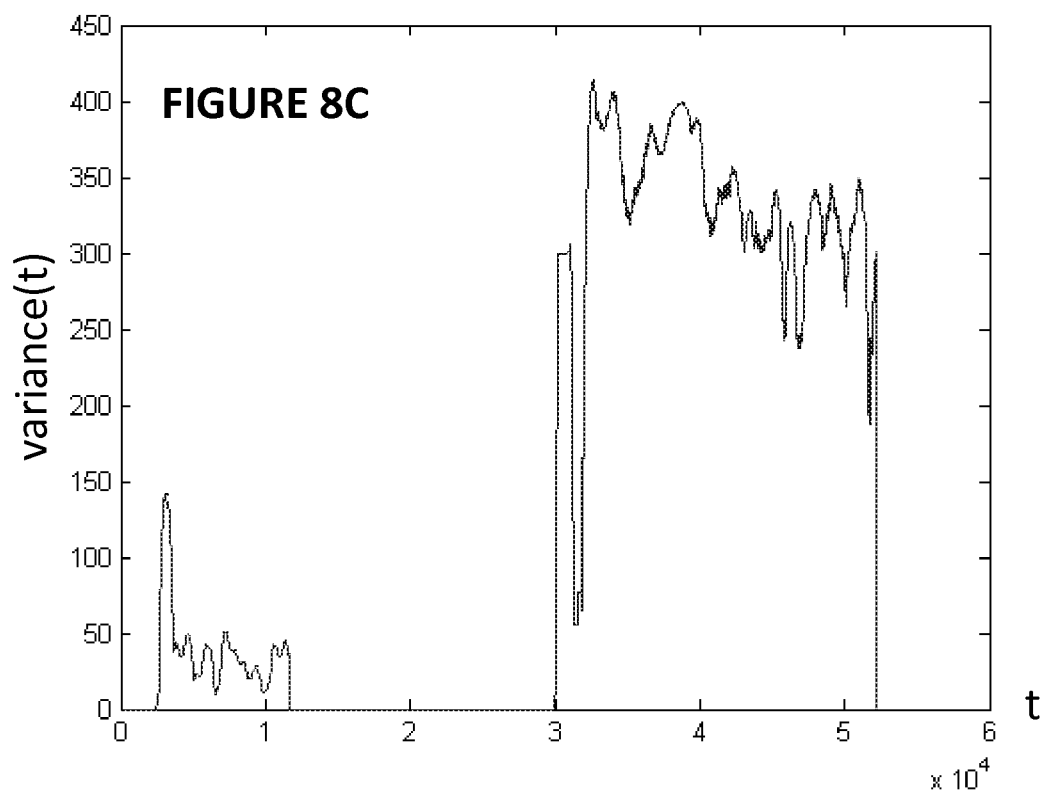

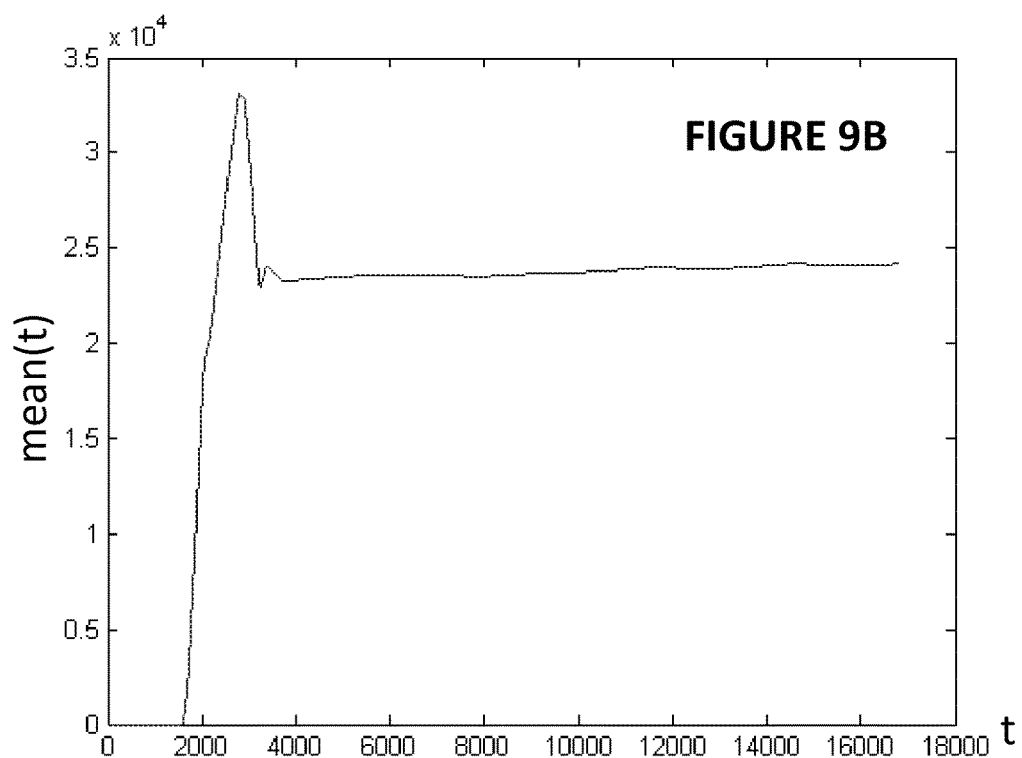
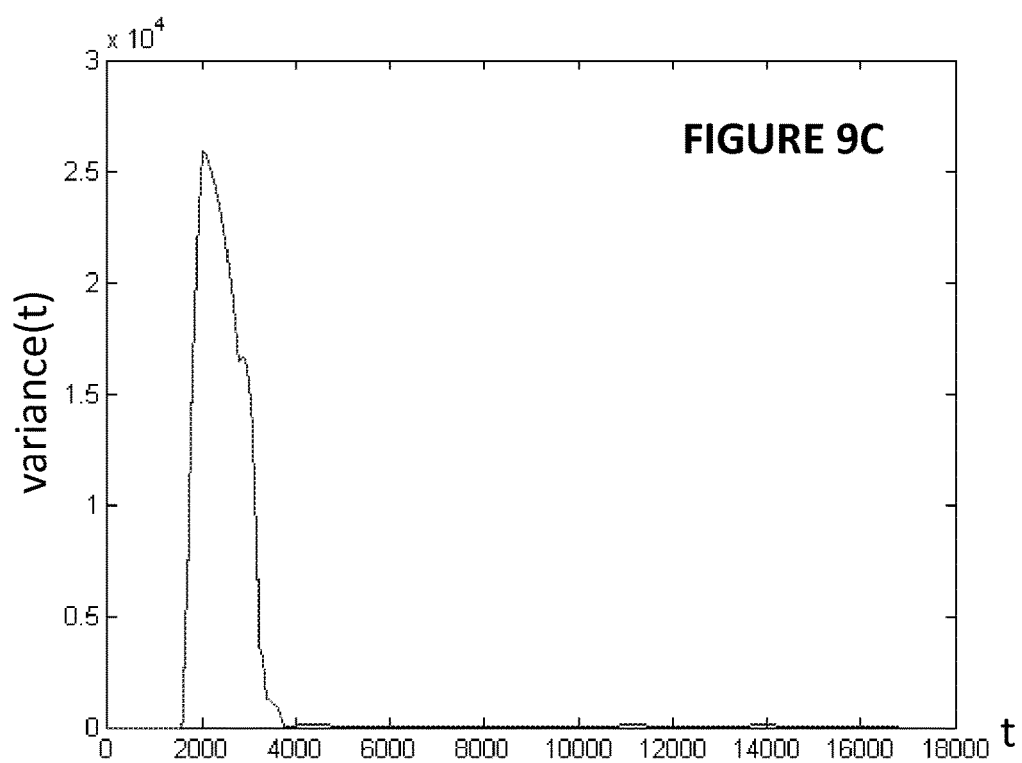

VIDEO PROCESSING FOR HUMAN OCCUPANCY DETECTION

TECHNICAL FIELD OF THE DISCLOSURE

The present invention relates to the field of computing, in particular to video processing for human occupancy detection.

BACKGROUND

Computer vision is a field in computing associated with applying algorithms to video streams to gain understanding of activity present in the video streams. Among others, one important application is surveillance, where it is desirable to detect human presence in video streams. Video processing is computationally intensive. At the same time, it is desirable for algorithms to detect human presence accurately. These two design goals can make it challenging to provide an algorithm which is computationally efficient while be able to detect human presence accurately.

BRIEF SUMMARY OF THE DISCLOSURE

Many conventional video processing algorithms attempting to detect human presence in a video stream often generate false positives on non-human movements such as plants moving in the wind, rotating fan, etc. To reduce false positives, a technique exploiting temporal correlation of non-human movements can accurately detect human occupancy while reject non-human movements. Specifically, the technique involves performing temporal analysis on a time-series signal generated based on an accumulation of foreground maps and an accumulation of motion map and analyzing the running mean and the running variance of the time-series signal. By determining whether the time-series signal is correlated in time, the technique is able to distinguish human movements and non-human movements. Besides having superior accuracy, the technique lends itself to an efficient algorithm which can be implemented on low cost, low power digital signal processor or other suitable hardware.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 7A-D shows plots of the time-series signal, running mean, running variance, first average values, and second average values, for a first exemplary scenario, according to some embodiments of the disclosure;

FIGS. 8A-D shows plots of the time-series signal, running mean, running variance, first average values, and second average values, for a first exemplary scenario, according to some embodiments of the disclosure; and FIGS. 9A-D shows plots of the time-series signal, running mean, running variance, first average values, and second average values, for a first exemplary scenario, according to some embodiments of the disclosure.

DESCRIPTION OF EXAMPLE EMBODIMENTS OF THE DISCLOSURE

Figure 1:
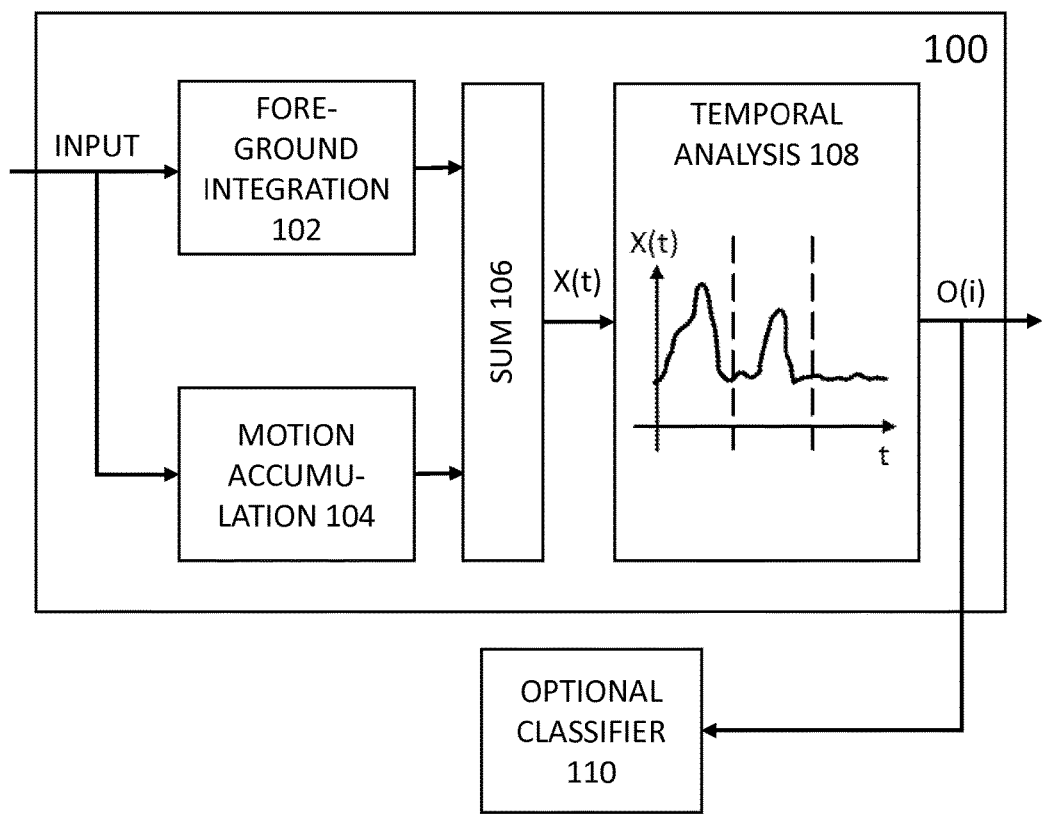
FIG. 1 shows an illustrative human occupancy detection system, according to some embodiments of the disclosure.

Basics of Detecting Human Presence in Video Streams

Computer vision algorithms for detecting human presence can come in many flavors, with their own shortcomings and advantages. One technique detects human presence by determining whether there is activity in the foreground, i.e., by comparing a frame against a background. Another technique detects human presence by determining whether there is motion, i.e., by comparing a frame against a previous frame. Both foreground-based and motion-based techniques are simple, but either technique can generate false-positives when there are moving non-human objects in the video stream, e.g., moving plants, tethered balloon moving in the air, rotating fans. As a result, either technique cannot be used outdoors. Yet another technique detects human presence by analyzing frames for contours, shapes, color, or other signatures. Such technique can be computationally intensive, due to complex image processing algorithms, thus may not always be suitable for real-time applications.

Human Occupancy

Human occupancy, as used herein, means one or more humans is present in a video stream, e.g., a human is visually present in one or more frames of the video stream. Exemplary scenarios include a man can walk across an area and leave, a woman can be sitting and typing in a monitored area, a child can be playing with toys in a crib, etc. To more accurately detect human occupancy, it is important to understand how occupancy is different from moving non-human objects. Generally speaking, human occupancy is associated with movement which is irregular, and in some ways, the movements can be viewed as "bursts of energy". For example, a man walking from one side of a room to sit on a chair, which can be detectable as irregular bursts of motion. In contrast, non-human movements are periodic, or episodic (repeated and regular, but not necessarily periodic). For example, motion from moving plants waving in the air is often episodic, which is often detectable as repeated motion. In another example, a rotating fan is periodic, which is detectable as periodic motion.

Unique Human Occupancy Detection Technique

Acknowledging differences in human movements versus non-human movements, a technique can accurately detect human occupancy through multiple stages of processing. In one stage, background frame differentiating can localize foreground areas through integration while reject episodic or periodic movements (e.g., fans, plants, etc.). In a second stage, inter frame differentiating can accumulate motion. In a third stage, accumulated motion in foreground area(s) generates a signal. In a fourth stage, temporal analysis is performed on the signal to detect human occupancy while being able to reject other non-human motion. Through multiple stages, the technique can accurately detect human occupancy while reject other non-human motion. The result is a technique which can reduce false positives that other techniques would tend to generate. Moreover, the technique can be implemented efficiently on a low cost, low power, efficient digital signal processor or other suitable hardware, making the solution particularly suitable real-time applications.

Human Occupancy Detection System

FIG. 1 shows an illustrative human occupancy detection system, according to some embodiments of the disclosure. The human occupancy detection system 100 takes a video stream as input (e.g., from a camera, a digital imaging device, vision sensor, etc.), and generates an output O(i). The video stream includes a sequence of frames (i.e., images captured over a period of time), and each frame has pixels having respective pixel values. The output O(i) can be a sequence of classification results associated with windows or time periods, wherein each classification result indicates human occupancy or no human occupancy for a given window or time period (in some cases, for a particular time instance). The human occupancy detection system 100 comprises a foreground integration block 102, a motion accumulation block 104, a summing block 106, and a temporal analysis block 108. Foreground integration block 102 generates one or more foreground areas D(t). Motion accumulation block 104 generates motion maps R(t). Each of these blocks performs a stage of the human occupancy detection technique which aims to detect human occupancy while reject non-human motions.

The output O(i) can be provided to one or more (optional) classifiers 110 to improve robustness, if desired. The classifier(s) 110 can include one or more of the following: head detection algorithms, (high level) image classifier based on skin and hair, classifier based on edges, classifier based on gradients, classifier based on color, frequency domain analysis, etc. The human occupancy detection system 100 can further include one or more computer-readable non-transitory medium for storing digital data, including the input, output, and any intermediate output(s)/data generated by the blocks.

The human occupancy detection system 100 operates to process frames of the video stream to generate an output O(i) having a sequence of classification results associated with windows or time periods. The foreground integration block 102 and the motion accumulation block 104 can, in some embodiments, serve as an initial classifier whether the video frames has activity worthwhile for further processing. If there are little or no foreground areas and/or the motion maps indicate little or no motion, the summing block 106 and the temporal analysis block 108 are not executed or are skipped. The output O(i) would indicate no occupancy. The summation block can, in some embodiments, serve as a classifier whether the video frames has some activity worthwhile for further processing. If the output of the summing block 106 X(t) indicates little or no activity, the temporal analysis block 108 is not executed or is skipped. The output O(i) would indicate no occupancy. The intermediate outputs or data of the blocks (e.g., one or more of: foreground maps, foreground areas, difference maps, motion maps, X(t)) can be stored and/or buffered in non-transitory computer-readable medium. In this manner, the (past) outputs/data can be used by the temporal analysis block 108 once (subsequent) outputs indicate activity worthwhile for further processing.

In some embodiments, the processing being performed by blocks of the human occupancy detection system 100 can take advantage of parallelism and pipelining, e.g., to allow human occupancy detection to be executed in real time. For instance, the foreground integration block and the motion accumulation block can be implemented in parallel. In another instance, processing of pixels of the same frame can also be performed in parallel since the processing of pixels do not depend on other pixels of the same frame.

The blocks shown can correspond to hardware processor(s) which can carry out or execute code embedded in non-transitory medium having instructions for executing operations for human occupancy detection. In some cases, the blocks can correspond to specialized hardware or circuitry provided or synthesized to carry out operations for human occupancy detection. The blocks shown illustrate signal flows of the technique and blocks which processes the signal flows. It is possible that not all frames of the video stream is processed by the human occupancy detection system 100. Processing for one or more frames may be skipped if the frames are deemed to carry redundant information, or deemed not necessary for accurate human occupancy detection. Processing for one or more frames may be skipped if a separate processing block and/or sensor indicates no human occupancy is likely (e.g., based on output(s) from, e.g., high level image filter, temperature sensor, motion sensor, pressure sensor, heat sensor, security sensor (e.g., door), clock, etc.).

Foreground Integration Block

Figure 2:
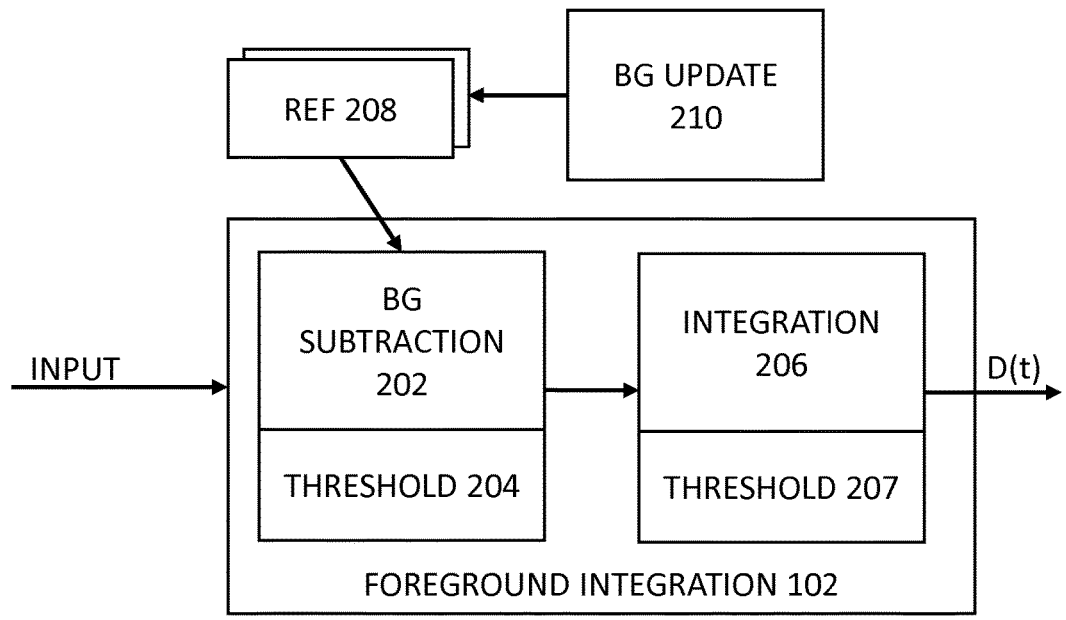
FIG. 2 shows an illustrative foreground integration block, according to some embodiments of the disclosure.

One of the stages of human occupancy detection, corresponding to the foreground integration block 102, involves generating foreground maps. Based on the foreground maps, areas of interests referred to as "foreground areas", can be localized based on a unique form of integration which rejects episodic and/or periodic motion. FIG. 2 shows an illustrative foreground integration block, according to some embodiments of the disclosure. The foreground integration block 102 can process a plurality of frames of the video stream to generate an output D(t) comprising zero, or one or more foreground areas for time t. The foreground integration block 102 can include a background subtraction block 202, a thresholding block 204, an integration block 206, and a thresholding block 207. For a given frame at time t=T, a foreground map is generated, and the given frame at time t=T can have zero, or one or more foreground areas localized as output D(t=T). For a plurality of frames associated with many instances of time t, a plurality of foreground maps are generated for the many instances of time t. For an instance time t=T, there may be zero, or one or more foreground areas D(t=T).

For a given frame at time t=T, background subtraction block 202 and the thresholding block 204 generates the foreground map by determining which pixels belong to foreground and which pixels belong to the background. Many suitable algorithms, e.g., background subtraction methods, can be used to generate such a foreground map having foreground pixel values identifying pixels of the given frame different from a background reference frame. The background reference frame can be provided by one or more reference frames 208. The foreground pixel values can take on a binary value (e.g., 0 or 1), or any suitable scale of values indicating the likelihood of a pixel belonging to the foreground versus background. The thresholding block 204, i.e., the first threshold value, can be adaptive (e.g., changes over time, changes based on changes in input conditions), or programmable based one or more conditions or parameters.

In one example, the foreground map having foreground pixels values (e.g., an array of values corresponding to each pixel of the frame) is determined by thresholding. If a difference between a pixel value of a given pixel of the given frame and a corresponding pixel value of the background reference frame is greater than a first threshold, a first foreground pixel value is assigned to the given pixel; otherwise, if the difference is less than or equal to a first threshold, a second foreground pixel value is assigned to the given pixel. The difference portion can be performed by the background subtraction block 202 based on the given frame and one or more reference frames 208. The thresholding portion can be performed by the thresholding block 204.

The generation of the foreground map having foreground pixel values at time t=T, denoted by foreground_pixel_value (t) for a given pixel, is illustrated by the following exemplary operation:

$$change(t) = abs\,(given\_frame(t) - reference\_frame)$$

$$foreground\_pixel\_value\,(t) = \begin{cases} 1 & change(t) > threshold \\ 0 & otherwise \end{cases}$$

The operation can be repeated for many pixels of a given frame to generate a foreground map of 1's and 0's for the given frame.

In some embodiments, the background reference frame from the one or more reference frames 208 can be updated by a background updating block 210 when there are significant and persistent changes detected in the image frame, e.g., light change, automated blinds, object moved, etc. For instance, the background updating block can implement a light change detection algorithm. For detecting light changes and updating the one or more reference frames 208 accordingly.

In some embodiments the foreground map can be processed by one or more morphological operations (blob analysis, connectivity analysis, or other morphological image processing) to provide a de-noising effect, e.g., to remove spurious noise and/or to remove small or irrelevant changes (e.g., removing 1's in the foreground map likely to have been caused by noise). Other operations suitable for providing a de-noising effect can also be used.

A sequence of foreground maps at various instances of time t are then provided as input to the integration block 206. The integration block 206 aids in rejecting episodic and/or periodic motion. The insight on which the integration block 206 is based is that episodic and/or periodic motion such as a rotating fan or a moving plant waving in the air would generate foreground pixel values that flips between 0's and 1's over a window of foreground maps. Preferably, the integration block 206 would reject pixels having foreground pixel values with such behavior. In some embodiments, the integration block 206 can localize one or more foreground areas (in a foreground map of time t=T) for a time t=T by integrating, on a per pixel basis, foreground pixel values over a first moving window of foreground maps (e.g., over foreground maps of time t=T−X to t=T) and comparing the integrated value against a second threshold to localize one or more foreground areas (in some cases, localization may result in no foreground areas). The integration block 206 can provide one or more of the following: a moving average integration, any suitable window-based integration, and weighted integrator, etc. A suitable integration block 206 can accumulate and/or combine the foreground pixel values over a window of foreground maps (e.g., over X*framerate number of foreground maps of time t=T−X to t=T, where X is a number of seconds in the window), while at the same time use the integration to reject pixels having episodic or periodic change in foreground pixel values over the first moving window of foreground maps as not being part of a foreground area. The window of foreground maps can, depending on the application, include X=10-20 seconds of foreground maps.

In some embodiments, integrating foreground pixel values comprises computing a weighted integration of foreground pixel values for a given pixel over the first moving window of foreground maps. The weighted integration can be implemented using a filter having multiple tabs corresponding to the window of foreground maps, whose coefficients correspond to the weights of the integration. The filter can output a sum of coefficients multiplied by corresponding foreground pixel values. Alternatively, the weighted integration can be implemented or estimated by a (first order) infinite impulse response (IIR) filter based integrator. The IIR filter can compute an integrated value for a given pixel based on a weighted sum of a previous integrated value and a present foreground pixel value for the given pixel. Effectively, the IIR filter can iteratively integrate the foreground pixel values for a given pixel over the window of foreground maps:

$$integrated(t) = \alpha*integrated(t-1) + (1-\alpha)*foreground\_pixel\_value(t)$$

Advantageously, the IIR filter based integrator can save memory usage. Furthermore, with this IIR filter, the current foreground pixel value at time t=T is computed iteratively by an integrated value based on past foreground pixel values, thereby serving as a smart integrator. Generally speaking, the value of alpha depends on the weight to be provided to the integrated value (computed based on past foreground pixel values) and the weight to be provided to the current foreground pixel value. If the foreground pixel values is to be integrated over X*framerate number of foreground maps, α can be defined as 1/(X*framerate).

For time t=T, the integration block 206 and the thresholding block 207 localizes zero, or one or more foreground areas. In some embodiments, the coefficients or weights of such integration is selected to generate an output (i.e., an integrated value for a given pixel at an instance of time t=T) which is smaller when foreground pixel values that flips between 0's and 1's over the window of foreground maps, while generating an output (i.e., an integrated value for a given pixel at an instance of time t=T) that is bigger when the foreground pixel values switches from 0's to a persistent number of 1's. With such behavior, the integrated value for a given pixel can be tested against a second threshold by threshold block 207. The thresholding block 207 can assign the given pixel to a foreground area (as potentially being associated with human occupancy, assigning a value 1) if an integrated value of foreground pixel values for the given pixel over the first moving window of foreground maps is greater than a second threshold, and otherwise, the threshold block 207 does not assign the given pixel to a foreground area (consider the pixel as part of the background or as being associated with non-human activity, assigning a value 0). The operation performed by the thresholding block 207 is illustrated by the following exemplary operation:

$$foreground\_area(t) = \begin{cases} 1 & if\ integrated(t) > threshold \\ 0 & otherwise \end{cases}$$

In some embodiments, frames having foreground_area (e.g., binary frames having 0's and 1's) can be saved as compressed bitmaps, since it can be compressed easily and save a lot of memory; using compressed bitmaps enable implementation of the human occupancy detection scheme on low memory chips and save power since there are far less accesses to external memory.

Using the integration block 206 and thresholding block 207, the foreground integration block 102 can generate an output D(t) that can reject pixels having episodic or periodic change in foreground pixel values over the first moving window of foreground maps as not being part of a foreground area. Specifically, the output D(t) can have the following illustrative characteristics. When there is a static or stationary change in the scene (such as a chair moved, a bag kept on the table), the output D(t) would have a constant foreground area without any changes over time. When there is a person walking or sitting and working, the output D(t) would keep changing over time. When there is a plant moving or a fan rotating, the output D(t) would have little to no foreground areas, since under periodic change the integration would generate a small integrated value which would not pass the threshold. The thresholding block 207, i.e., the second threshold value, can be adaptive (e.g., changes over time, changes based on changes in input conditions), or programmable based one or more conditions or parameters.

Motion Accumulation Block

Figure 3:
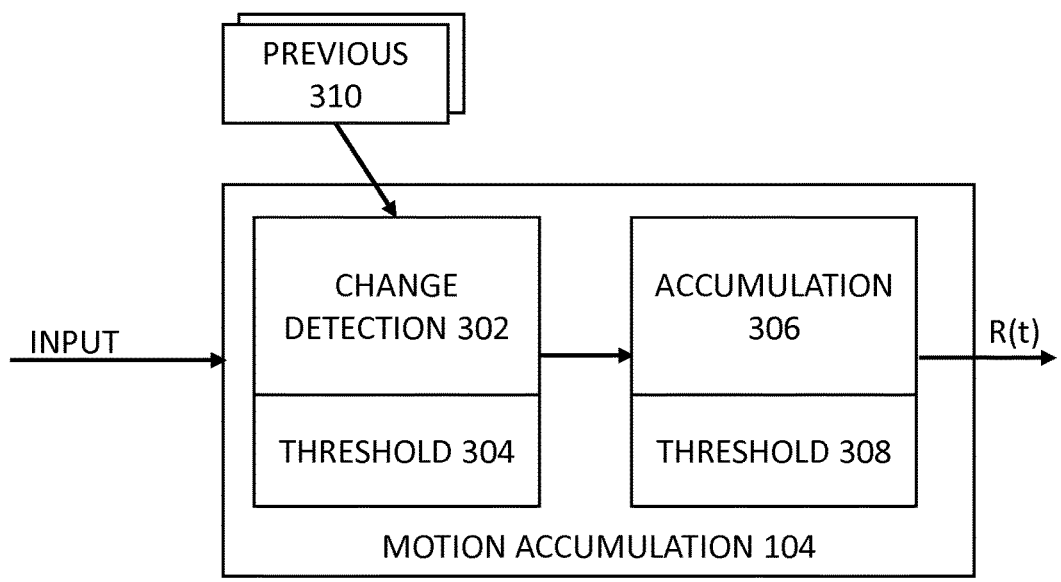
FIG. 3 shows an illustrative motion accumulation block, according to some embodiments of the disclosure.

One of the stages of human occupancy detection, corresponding to the motion accumulation block 104 involves generating motion maps. Specifically, the motion accumulation block 104 aims to detect and accumulate motion activity so that the motion map can be used an indicator for energy of movement in the frame. FIG. 3 shows an illustrative motion accumulation block, according to some embodiments of the disclosure. The motion accumulation block 104 can process a plurality of frames of the video stream to generate an output R(t) comprising a plurality of motion maps for many instances of time t. A motion map for time t has motion pixel values that can indicate sufficient movement or activity present at time t for many pixels. The motion accumulation block 104 can include a change detection block 302, a thresholding block 304, an accumulation block 306, and a thresholding block 308. For a given frame at time t=T, a difference map is generated, and a motion map is also generated as output R(t=T). For a plurality of frames associated with many instances of time t, a plurality of difference maps and a plurality of motion maps are generated for the many instances of time t.

For a given frame at time t=T, change detection block 302 and the thresholding block 304 generates the difference map by whether there is sufficient change inter or between frames. Many suitable algorithms, e.g., motion detection algorithms, can be used to generate the difference map having difference pixel values identifying pixels of the given frame different from a frame previous to the given frame. The frame previous to the given frame can be provided by one or more previous frames 310. The difference pixel values can take on a binary value (e.g., 0 or 1), or any suitable scale of values indicating the amount of change inter or between frames.

In one example, the difference map having difference pixels values (e.g., an array of values corresponding to each pixel of the frame) is determined by thresholding. If a difference between a pixel value of a given pixel of the given frame and a corresponding pixel value of the frame previous to the given frame is greater than a third threshold, a first difference pixel value is assigned to the given pixel; otherwise, if the difference is equal to or less than the third threshold, a second difference pixel value is assigned to the given pixel. The difference portion can be performed by the change detection block 302 based on the given frame and one or more previous frames 310. The thresholding portion can be performed by the thresholding block 304. The thresholding block 304, i.e., the third threshold value, can be adaptive (e.g., changes over time, changes based on changes in input conditions), or programmable based one or more conditions or parameters.

The generation of the difference map having difference pixel values at time t=T, denoted by motion_difference(t) for a given pixel, is illustrated by the following exemplary operation:

$$\text{motion\_difference}(t) = \text{abs}(\text{given\_frame}(t) - \text{previous\_frame})$$

$$\text{difference\_pixel\_value}(t) = \begin{cases} 1 & \text{motion\_difference}(t) > \text{threshold} \\ 0 & \text{otherwise} \end{cases}$$

The operation can be repeated for many pixels of a given frame to generate a difference map of 1's and 0's for the given frame. In some embodiments, frames having difference_pixel_value (e.g., binary frames having 0's and 1's) can be saved as compressed bitmaps, since it can be compressed easily and save a lot of memory; using compressed bitmaps enable implementation of the human occupancy detection scheme on low memory chips and save power since there are far less accesses to external memory.

In some embodiments the difference map can be processed by one or more morphological operations (blob analysis, connectivity analysis, or other morphological image processing) to provide a de-noising effect, e.g., to remove spurious noise and/or to remove small or irrelevant inter or between frame differences (e.g., removing 1's in the difference map likely to have been caused by noise). Other operations suitable for providing a de-noising effect can also be used.

A sequence of difference maps at various instances of time t are then provided as input to the accumulation block 306. The accumulation block 306 aids detecting motion having sufficient energy (and eliminate movements which do not have a lot of energy), by generating a motion map having motion pixel values by accumulating, on a per pixel basis, difference pixel values over a second moving window of difference maps. The insight on which the accumulation block 306 is based is that human occupancy activity would generate motion with a substantial amount of energy. For example, small movements associated with human occupancy such as typing would generate small motion; when small motions are accumulated over time, the amount of energy is detectable from the accumulated motion pixel values. Preferably, the accumulation block 306 would identify pixels exhibiting sufficient motion. In some embodiments, the accumulation block 306 can accumulate motion pixel values (for a given pixel) comprises computing a sum of difference pixel values for a given pixel over the second moving window of difference maps (e.g., over M*framerate number of difference maps of time t=T−M to t=T, where M is a number of seconds in the window, such as 10-20 seconds):

$$\text{accumulated}(t) = \sum_{i=t-M}^{i=t} \text{difference\_pixel\_value}(i)$$

In some embodiments, the sum of difference pixel values is a weighted sum. In some embodiments, the sum of difference pixel values is provided by a moving window integrator. In some embodiments, an IIR filter can be used to implement the accumulation, which can save memory. Furthermore, with this IIR filter, the past foreground pixel values are iteratively summed with the current foreground pixel value at time t=T, thereby serving as a smart accumulator.

Based on the sum, the thresholding block 308 can generation a motion map that can indicate an amount of motion for each pixel (e.g., as 1's (sufficient motion) or 0's (insufficient motion), or other suitable range of values). To determine motion pixel values, the accumulated value computed by the accumulation block for a given pixel can be tested against a fourth threshold by threshold block 308. The thresholding block 308 can, if an accumulated value of difference pixel values for the given pixel over the second moving window of difference maps is greater than a fourth threshold (as having sufficient motion), assigning a first motion pixel value to the given pixel (assigning a value of 1); otherwise if the accumulated value is equal to or less than the fourth threshold, the thresholding block 308 can assign a second motion pixel value to the given pixel (assigning a value of 0). The operation performed by the thresholding block 308 is illustrated by the following exemplary operation:

$$\text{motion\_pixel\_value}(t) = \begin{cases} 1 & \text{if accumulated}(t) > \text{threshold} \\ 0 & \text{otherwise} \end{cases}$$

The operation can be repeated for many pixels of a given frame to generate a motion map of 1's and 0's for the given frame. The thresholding block 308, i.e., the fourth threshold value can be adaptive (e.g., changes over time, changes based on changes in input conditions), or programmable based one or more conditions or parameters.

In some embodiments, the motion map can be processed by one or more morphological operations (blob analysis, connectivity analysis, or other morphological image processing) to provide a de-noising effect, e.g., to remove spurious noise and/or to remove small or irrelevant motion activity (e.g., removing 1's in the motion map likely to have been caused by noise or non-human activity). Other operations suitable for providing a de-noising effect can also be used.

In some embodiments, the motion maps of the past frames are compressed lossless and stored in computer-readable non-transitory memory.

Summing Block and Temporal Analysis Block

After foreground integration and motion accumulation, the human occupancy detection generates a signal that can be used to classify whether there is human occupancy and no human occupancy. As previously discussed, motion or activity associated with human occupancy tend to exhibit bursts of energy, and such bursts of energy is typically is not correlated in time. Accordingly, the human occupancy detection system 100 generates a signal which would exhibit peaks (associated with bursts of energy that is not correlated in time or blocks of time) if plotted over time t when there is human occupancy, and no peaks if there is no human occupancy (in some cases the signal has peaks which are correlated in time indicating the energy is not associated with human occupancy).

To generate the signal, in particular, a time-series signal X(t), the human occupancy detection system sums the motion pixel values in a motion map R(t=T) in the one or more foreground areas D(t=T) a sample X(t=T) for the time-series signal X(t). To sum the motion pixel values in the one or more foreground areas, an integral image (or summed area table) of the motion areas can be used (which can save many computations). The time-series signal is then analyzed to assess whether peaks are present for a given window or period of time. While motion associated with non-human occupancy would appear as activity in the X(t) signal, such motion would not exhibit as peaks in X(t), or even if it exhibits as peaks in X(t), such peaks would be correlated in time. As a result, the human occupancy system can accurately detect human occupancy while reject non-human movements to reduce false positives.

Figure 4:
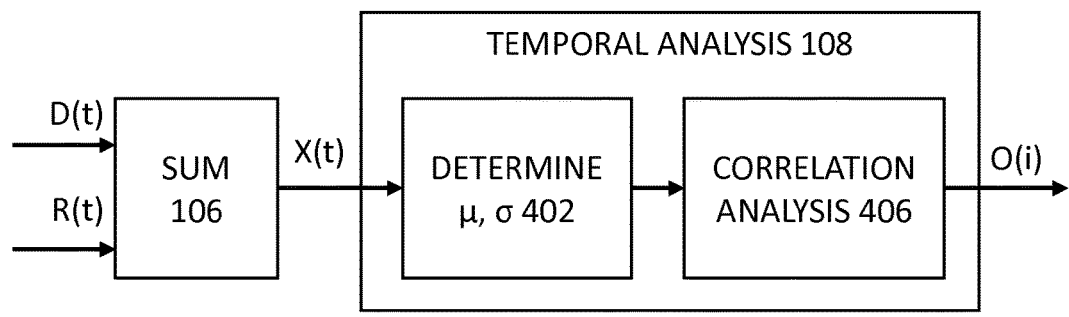
FIG. 4 shows an illustrative summing block and temporal analysis block, according to some embodiments of the disclosure.
Figure 5:
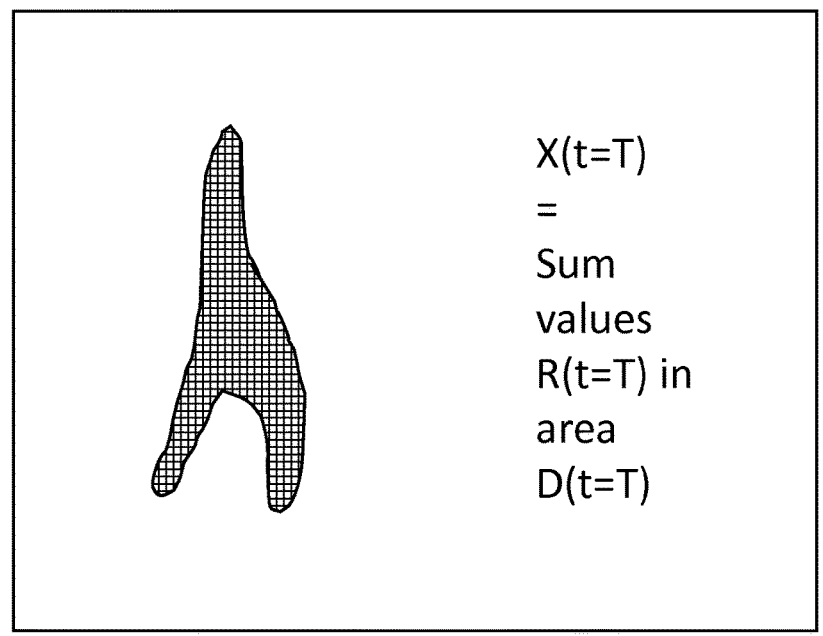
FIG. 5 illustrates generation of a time-series signal by a summing block, according to some embodiments of the disclosure.

FIG. 4 shows an illustrative summing block and temporal analysis block, according to some embodiments of the disclosure. The summing block 106 sums motion pixel values in the one or more foreground areas to generate a sample X(t=T) of a time-series signal X(t), and the temporal analysis block 108 performs temporal analysis on the time-series signal X(t) to detect human occupancy, or no human occupancy. FIG. 5 illustrates generation of a time-series signal by a summing block, according to some embodiments of the disclosure. In this example, a motion map D(t=T) is illustrated as a rectangle with a blob as a localized foreground area D(t=T). The motion pixel values in the blob area would have the value 1, whereas the motion pixel values outside of the blob area would have the value 0. The motion pixel values D(t=T) (illustrates as a grid pattern in the FIGURE, having a plurality of 1's) in the blob D(t=T) are summed by the summing block 106 to generate a sample X(t=T) for the time-series signal X(t). Such operation is performed for many instances for time t.

Temporal Analysis on the Time-Series Signal

As previously mentioned, the insight on which the temporal analysis is based is that human motion (associated with human occupancy) would be seen as peaks in X(t) (irregular burst of energy, not correlated in time), and non-human motion such as moving plants inside rooms, revolving fans, curtains moving would generate some activity in in X(t) (peaks which may be correlated in time) that is distinguishable numerically from the peaks associated with human occupancy. For instance, if X(t) has many high peaks which is correlated over time, or exhibiting similar behavior over time, it means the energy of motion in X(t) is associated with non-human activity. One further insight to the temporal analysis is that the non-human motion would generating a mean ($\mu$) and variance ($\sigma$) which indicates that X(t) is correlated in time—over blocks of time.

By examining the mean and variance, it is possible to numerically distinguish human movements versus non-human movements present in X(t). Phrased differently, if a running mean of the time-series signal does not suggest or indicate X(t) is correlated in time and/or a running variance of the time-series signal does not suggest or indicate X(t) is correlated in time, the time-series signal X(t) may suggest human occupancy.

Generating Mean and Variance

To generate the mean and variance, the determining $\mu$ and $\sigma$ block 402 can estimate or determine the (running) mean and (running) variance at a given time t=T using the following numerical operations that are equivalent to computing a running mean of the time-series signal X(t) and a running variance of the time-series signal X(t):

$$\begin{aligned}\text{Mean}(t) &= \text{Moving average of } X(t) \text{ from } t = t - P \text{ to } t \\ &= (X(t-P) + X(t-P+1) + \ldots X(t-2) + X(t-1) + X(t))/P\end{aligned}$$

$$\begin{aligned}\text{Variance}(t) &= \text{Moving average of variance of } X(t) \text{ from } t = t - P \text{ to } t, \\ &= [(X(t-P)^* X(t-P) - \text{Mean}(t-P)) + \ldots \\ &\quad (X(t)^* X(t) - \text{Mean}(t))]/P\end{aligned}$$

The above computations can be reduced to simpler digital signal processing operations, such as:

Sum($t$)=Sum($t$−1)−$X(t−P)$+$X(t)$

Mean($t$)=Sum($t$)/$P$

Sum($t$−1)=Sum($t$)

SumSquare($t$)=SumSquare($t$−1)−$X(t−P)^*X(t−P)$+$X(t)^*X(t)$

Sigma($t$)=SumSquare($t$)/$P$−Mean($t$)*Mean($t$)

SumSquare($t$−1)=SumSquare($t$)

Generating Finite Differences of the Mean and Variance

One aspect of the temporal analysis is to examine the difference between mean from t=T−1 to t=T and difference between variance from t=T−1 to t=T (i.e., compare consecutive means and variances). If the mean and variance are correlated in time, difference between mean from t=T−1 to t=T and difference between variance from t=T−1 to t=T would have small values. Also, if the signal X(t) is correlated in time, its variance is generally be lower. The plots would show low values of variance and almost/substantially flat mean in the plot of X(t) over time.

To examine the difference between mean from t=T−1 to t=T and difference between variance from t=T−1 to t=T, the correlation analysis block 406 can compute a first finite difference of the running mean (Div_Mean(t)) and a second finite difference of the running variance (Diff_Variance(t)) at time t using the following numerical operations:

Notation−abs($X$−$Y$)=absolute value or magnitude of the difference between $X$ and $Y$ Diff_Mean($t$)=abs(Mean($t$)−Mean($t$−1)), Diff_Variance($t$)=abs(Variance($t$)−Variance($t$−1))

Generating Average Values of the Finite Differences

Another aspect of the temporal analysis includes of finding the average of the Diff_Mean(t) for a plurality of time periods or windows of time and the average of the Diff_Variance(t) for a plurality of time periods or windows of time. Examining the average of the finite differences for multiple time periods can numerically determine whether the time-series signal X(t) has peaks associated with human occupancy. The correlation analysis block 406 can compute a plurality of first average values (Avg_Diff_Mean(i)), wherein each first average value is computed based on a window of values of the first finite difference (Diff_Mean (t)), and compute a plurality of second average values (Avg_Diff_Variance(i)), wherein each second average value is computed based on a window of values of the second finite difference (Diff_Variance(t)). The windows can be overlapping or non-overlapping.

To examine the average difference, the correlation analysis block 406 can compute average difference using the following numerical operations:

Avg_Diff_Mean($i$)=sum(Diff_Mean($t$))/$L$ over a time period $t$−$L$ to $t$

Avg_Diff_Mean($i$+1)=sum(Diff_Mean($t$))/$L$ over a time period $t$+1,$t$+$L$

Avg_Diff_Mean($i$+2)=sum(Diff_Variance($t$))/$L$ over a time period $t$+$L$+1,$t$+2$L$ Avg_Diff_Variance($i$)=sum(Diff_Variance($t$))/$L$ over a time period $t$−$L$ to $t$ Avg_Diff_Variance($i$+1)=sum(Diff_Variance($t$))/$L$ over a time period $t$+1,$t$+$L$ Avg_Diff_Variance($i$+2)=sum(Diff_Variance($t$))/$L$ over a time period $t$+$L$+1,$t$+2$L$ If one or more, or if multiple of time periods, do not show any peaks at all (e.g., if the average is equal to or below a threshold), then the temporal analysis detects no human occupancy. If one or more, or if multiple of time periods, do show peaks (e.g., if the average is above a threshold), then the temporal analysis detects human occupancy. Through this averaging process, activity in X(t) associated with non-human activity would be transformed into smaller average values relative to average values computed based on activity in X(t) associated with human activity. When the difference from blocks of time are correlated in time (correlated over blocks of time), the average values would hardly show any significance. Accordingly, the correlation analysis block 406 can detect human occupancy, if one or more (or multiple) ones of the plurality of first average values in series is greater than a fifth threshold, and detect no human occupancy otherwise. Furthermore, the correlation analysis block 406 can detect human occupancy if one or more (or multiple) ones of the plurality of second average values in series is greater than a sixth threshold, and detect no human occupancy otherwise. The fifth threshold value and/or the sixth threshold value can be adaptive (e.g., changes over time, changes based on changes in input conditions), or programmable based one or more conditions or parameters.

Phrased differently, for human occupancy to be detected, Avg_Diff_Mean(i) and Avg_Diff_Sigma(i) should have values above a threshold, i.e., show one or more peaks at several values of i. If the values are not above the threshold, i.e., there are no peaks at all for several values of i, then no human occupancy is to be detected. In some embodiments, the correlation analysis block 406 examines whether Avg_Diff_Mean(i) and Avg_Diff_Variance(i) for a given number of periods are concurrently above respective thresholds to trigger human occupancy detection for increased robustness. In some other embodiments, the correlation analysis block 406 examines whether the average values for either Avg_Diff_Mean(i) or Avg_Diff_Variance(i) for a given number of periods are concurrently above respective thresholds to trigger human occupancy detection for increased robustness.

Human Occupancy Detection Method

Figure 6:
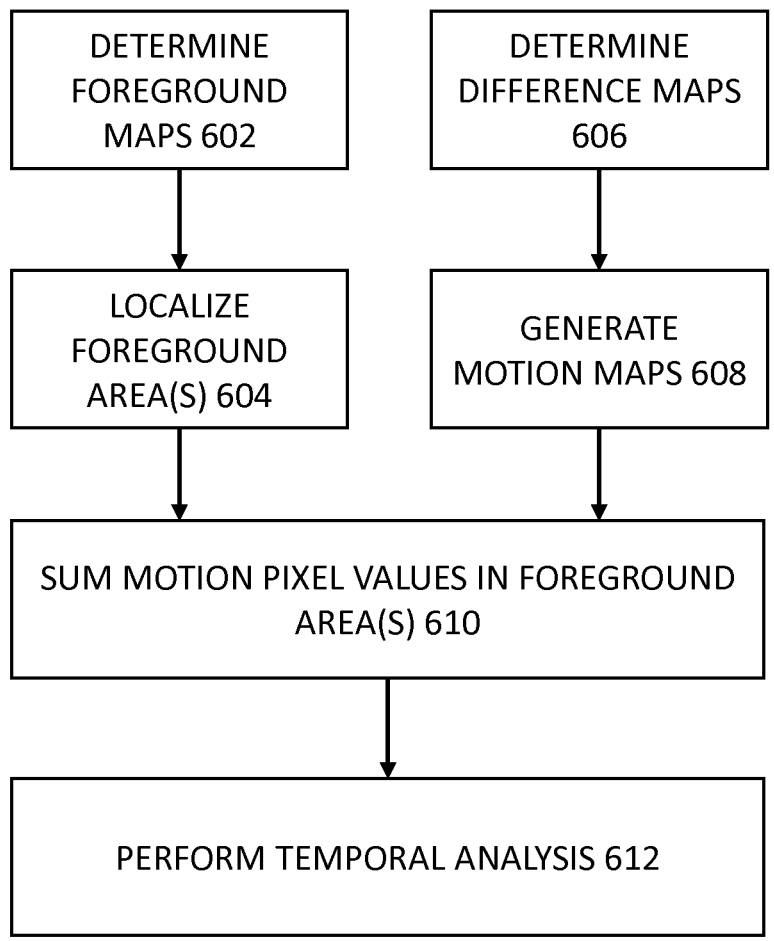
FIG. 6 shows a flow diagram of an exemplary method for detecting human occupancy in a video stream while distinguishing human movements versus non-human movements, according to some embodiments of the disclosure.

FIG. 6 shows a flow diagram of an exemplary method for detecting human occupancy in a video stream while distinguishing human movements versus non-human movements, according to some embodiments of the disclosure. The method can be carried out by the systems and blocks shown in FIGS. 1-5. The method includes processing a plurality of frames of the video stream. For a given frame, the processing comprises: (1) determining a foreground map having foreground pixel values identifying pixels of the given frame different from a background reference frame (task 602), (2) localizing one or more foreground areas in the foreground map by integrating, on a per pixel basis, foreground pixel values over a first moving window of foreground maps (task 604); (3) determining a difference map having difference pixel values identifying pixels of the given frame different from a frame previous to the given frame (task 606); (4) generating a motion map having motion pixel values by accumulating, on a per pixel basis, difference pixel values over a second moving window of difference maps (task 608), (5) summing motion pixel values in the one or more foreground areas to generate a sample of a time-series signal (task 610), and performing temporal analysis on the time-series signal to detect human occupancy (task 612).

First Exemplary Scenario: Human Occupancy

Figure 7A:
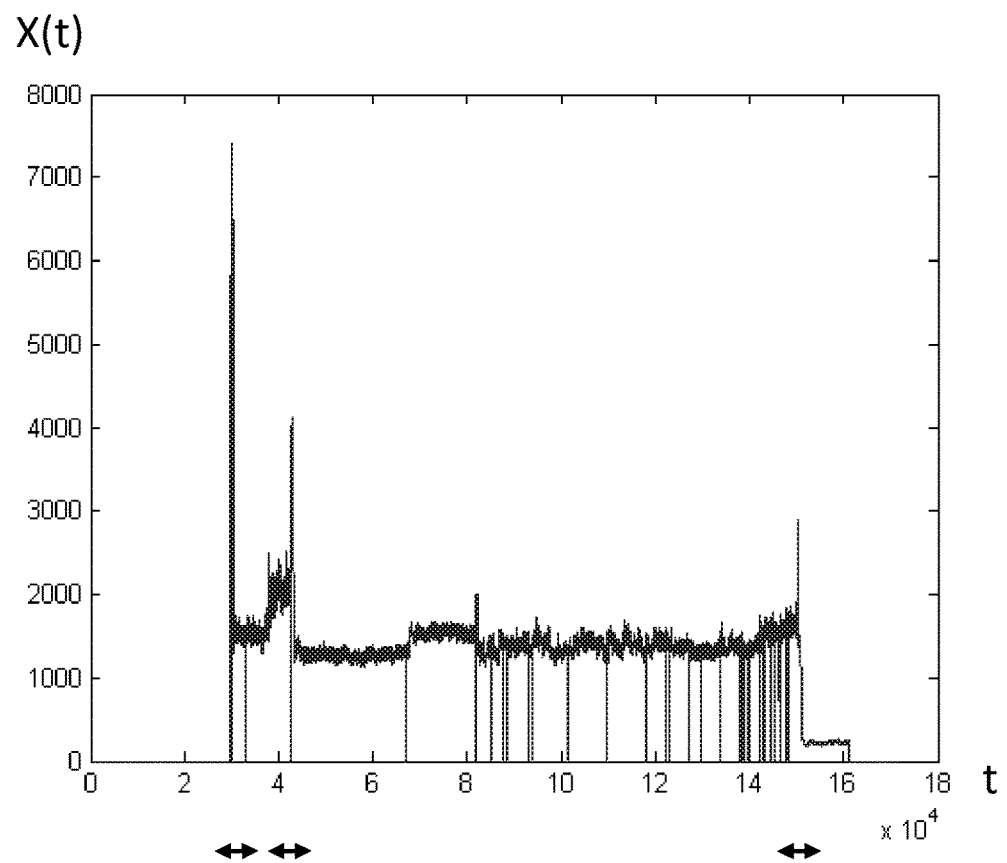
Figure 7D:
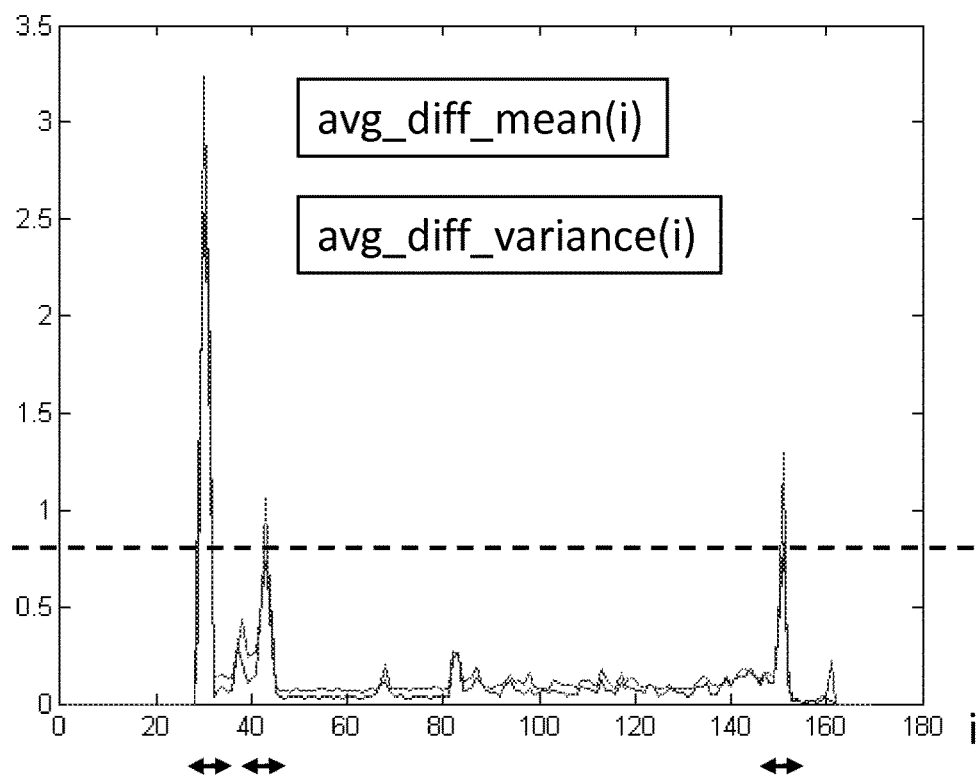

FIGS. 7A-D shows plots of the time-series signal, running mean, running variance, first average values, and second average values, for a first exemplary scenario, according to some embodiments of the disclosure. It can be seen in FIG. 7A, that the signal X(t) exhibits several peaks which are associated with human occupancy, and exhibits some activity during the "flat" periods which are associated with non-human movements (e.g., a rotating fan). FIGS. 7B-C show the running mean Mean(t) and the running variance Variance(t) respectively. FIG. 7D shows the plots for Avg_Diff_Mean(i) and Avg_Diff_Variance(i). Using an exemplary threshold of 0.7, it is possible to accurately detect human occupancy, while reject periods associated with non-human movements by numerically comparing the average values against the threshold.

Second Exemplary Scenario: No Human Occupancy

Figure 8A:
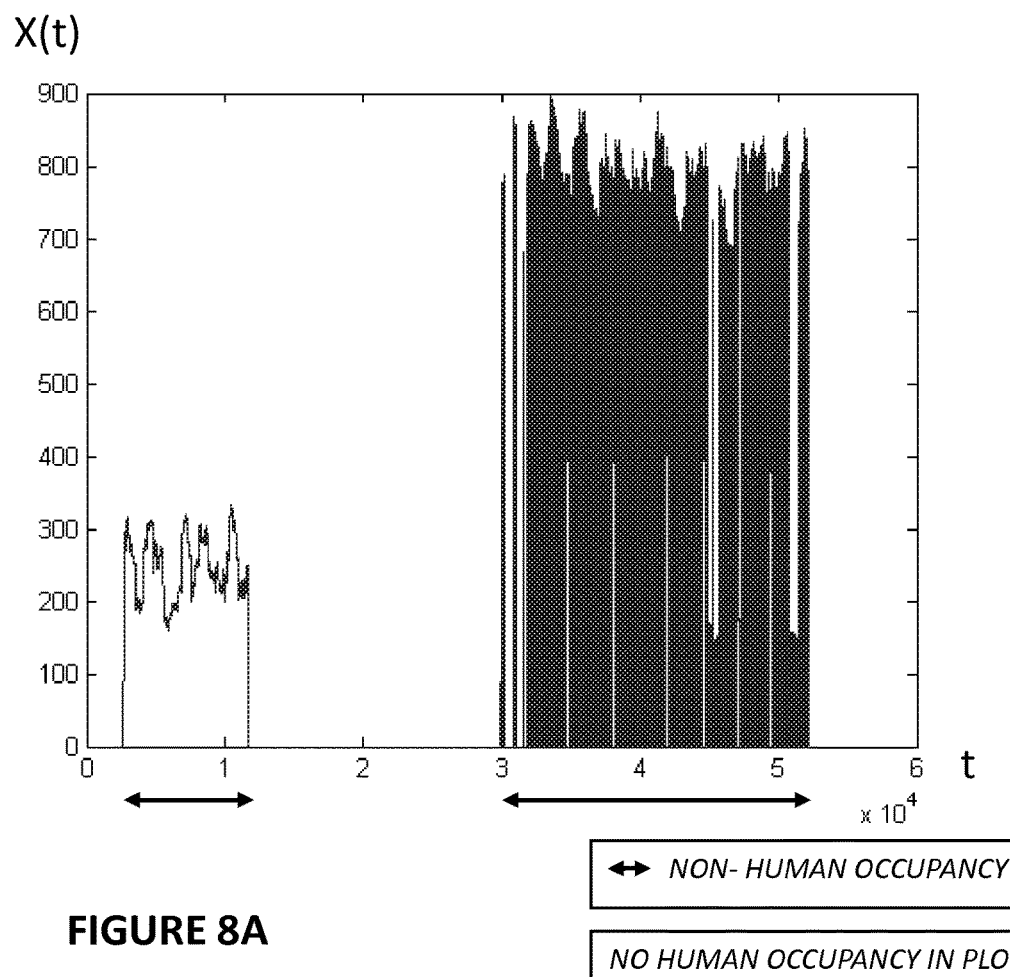
Figure 8D:
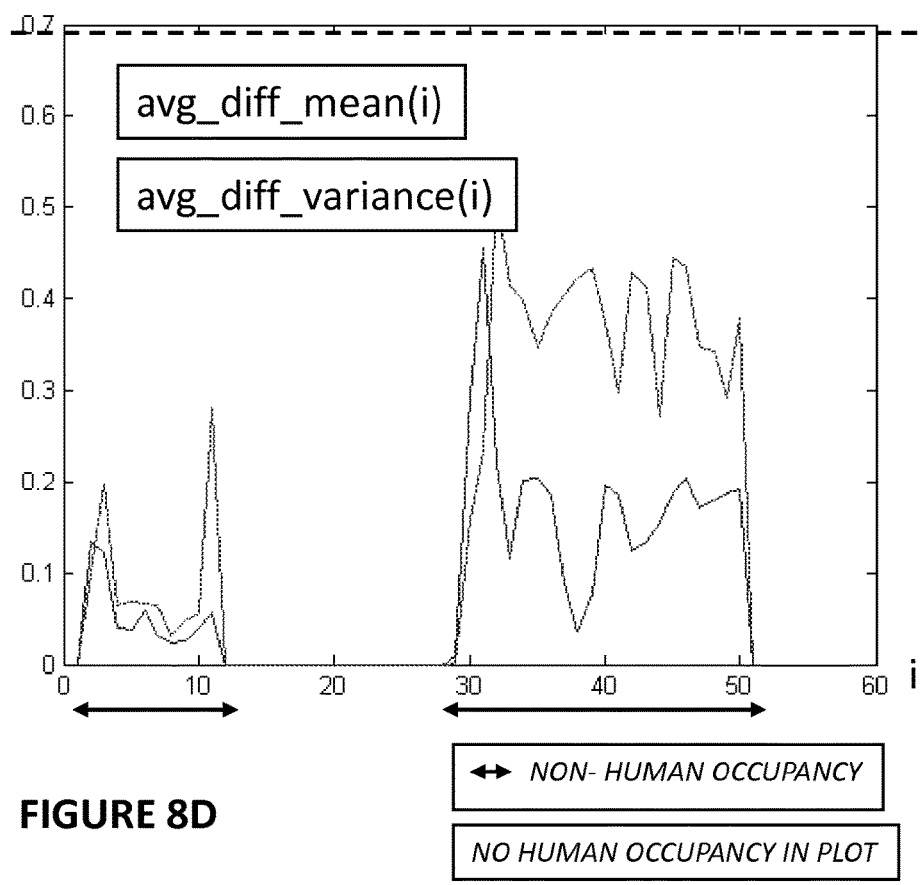

FIGS. 8A-D shows plots of the time-series signal, running mean, running variance, first average values, and second average values, for a second exemplary scenario, according to some embodiments of the disclosure. It can be seen in FIG. 8A, that the signal X(t) exhibits no peaks which are associated with human occupancy, and exhibits two periods of activity associated with non-human movements. FIGS. 8B-C show the running mean Mean(t) and the running variance Variance(t) respectively. FIG. 8D shows the plots for Avg_Diff_Mean(i) and Avg_Diff_Variance(i). Using an exemplary threshold of 0.7, it is possible to reduce false positives and reject the two periods as being associated with non-human movements by numerically comparing the average values against the threshold.

Third Exemplary Scenario: No Human Occupancy

Figure 9A:
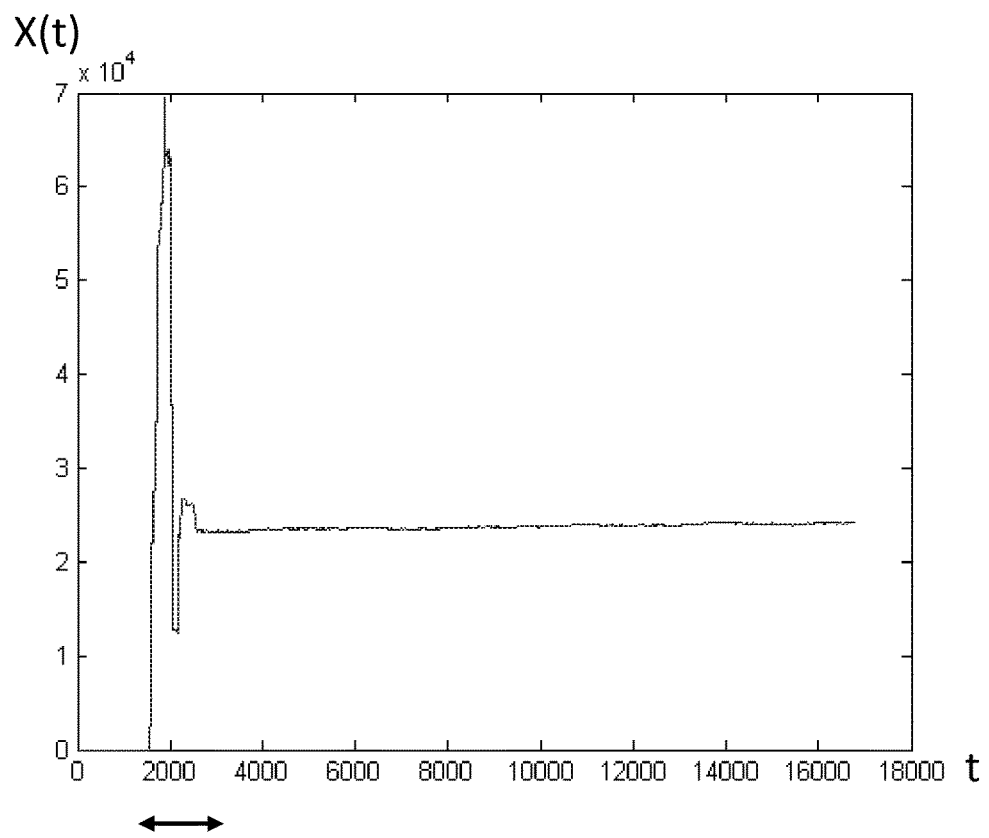
Figure 9D:
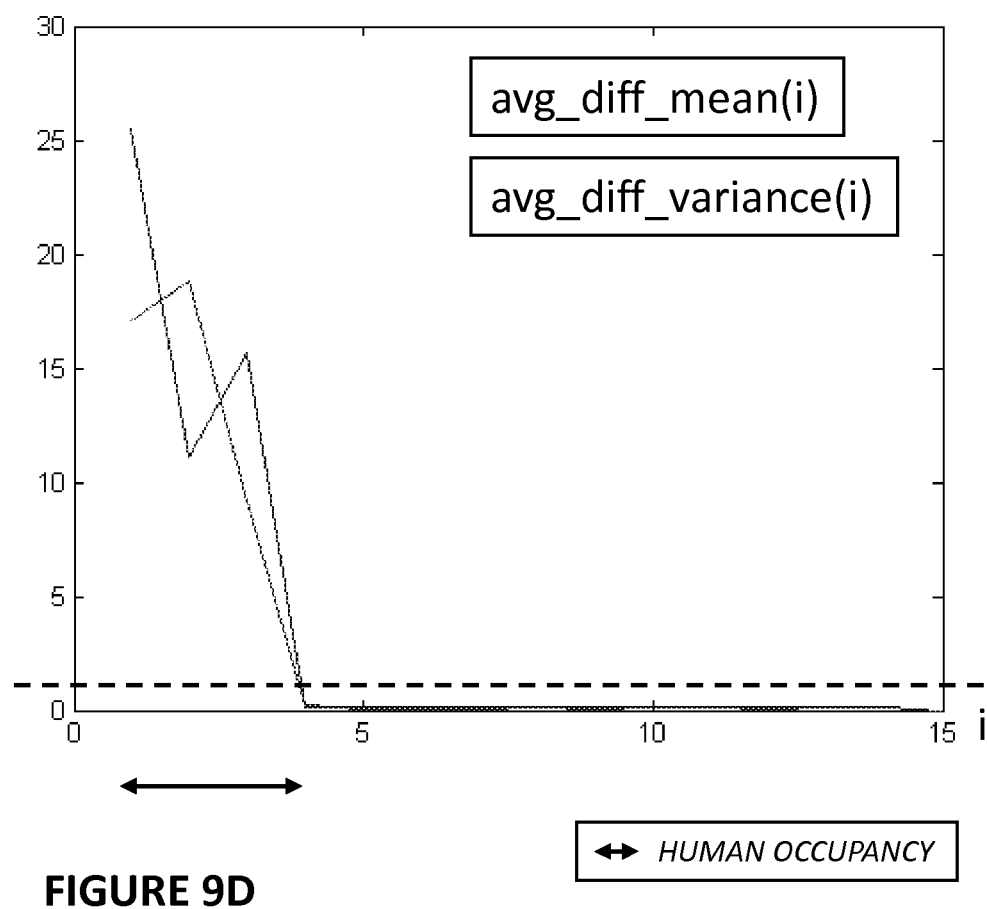

FIGS. 9A-D shows plots of the time-series signal, running mean, running variance, first average values, and second average values, for a first exemplary scenario, according to some embodiments of the disclosure. It can be seen in FIG. 9A, that the signal X(t) exhibits a period having two peaks which are associated with human occupancy (a man entering an area and leaving), and exhibits some activity during a prolonged "flat" periods which are associated with non-human movements. FIGS. 9B-C show the running mean Mean(t) and the running variance Variance(t) respectively. FIG. 9D shows the plots for Avg_Diff_Mean(i) and Avg_Diff_Variance(i). Using an exemplary threshold of 0.7, it is possible to accurately detect human occupancy, while reject periods associated with non-human movements by numerically comparing the average values against the threshold.

Variations and Implementations

Many of the numerical computations applies a threshold. It is understood by one skilled in the art that the threshold can vary depending on the application. While in some embodiments the thresholds are empirically determined, in some embodiments, the thresholds can be adaptive (e.g., changes over time or changes based on other factors such as noise level, the video stream, the signal X(t), etc.). Furthermore, many of the numerical computations involve a moving window. While in some embodiments, the moving window utilizes past data points, in some embodiments, the moving window can utilize subsequent data points, or both past data points and subsequent data points. The size of the moving window can be programmable or adaptive based on input conditions (e.g., presence of noise).

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, industrial process control, audio and video equipment, security systems, surveillance systems, remote sensing systems, Internet of Things, and other digital-processing-based systems. Moreover, certain embodiments discussed above can be provisioned in digital signal processing technologies for medical subject monitoring, patient monitoring, and home healthcare. Other applications can involve automotive technologies (e.g., man-less driving systems, driver assistance systems, braking systems, infotainment and interior applications of any kind, camera-based safety systems (to detect passengers, pedestrians, etc.). In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and human tracking (e.g., for digital still cameras, camcorders, etc.). Other consumer applications can include providing human occupancy detection on smartphones, tablets, security systems, PCs, gaming technologies, virtual reality, simulation training, etc.

One example application of human occupancy detection is human/car occupancy in parking lots, e.g. parking spots. Detecting occupancy can provide effective asset management in car parks. For example, suppose a parking lot is empty and then a car gets parked. When the transitioning happens from empty to human/car occupancy, the method for detecting human occupancy will detect bursts of energy (e.g., energy accumulation). When the owner parks and leaves, after certain time, the system can mark the time period as stationary, or "parked", because the motion pixel values in the motion map would be zero or very small (while foreground map would suggest a foreground object is present). Using the human occupancy method, it is possible to transition the state of a parking spot from "empty" to "parking" to "parked" to "leaving" to "empty".

Parts of various apparatuses for human occupancy detection can include electronic circuitry to perform the functions described herein. In some cases, one or more parts of the apparatus can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer medium.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the human occupancy detection functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more blocks. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to human occupancy detection, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

What is claimed is:

1. A method for determining occupancy in a video stream, comprising:
processing a plurality of frames of the video stream, wherein for a given frame, processing comprises localizing one or more foreground areas in a foreground map and generating a motion map, wherein localizing the one or more foreground areas comprises assigning a given pixel to a foreground area if an integrated value of foreground pixel values for the given pixel over a moving window of foreground maps is greater than a threshold;
generating a time-series signal based on the motion map and the localized one or more foreground areas; and
determining whether there is occupancy in the video stream based on temporal analysis of the time-series signal, wherein the temporal determines whether peaks of the time-series signal are uncorrelated that indicates occupancy.

2. The method of claim 1, wherein processing the plurality of frames further comprises generating the foreground map having foreground pixel values identifying pixels of the given frame that are different from a background reference frame.

3. The method of claim 2, wherein generating the foreground map comprises:
   if a difference between a pixel value of a given pixel of the given frame and a corresponding pixel value of the background reference frame is greater than a second threshold, assigning a first foreground pixel value to the given pixel; and
   otherwise, assigning a second foreground pixel value to the given pixel.

4. The method of claim 1, wherein localizing the one or more foreground areas comprises rejecting pixels having episodic or periodic change in foreground pixel values over the moving window of foreground maps as not being part of the foreground area.

5. The method of claim 1, wherein:
   localizing the one or more foreground areas in the foreground map comprises integrating on a per pixel basis, foreground pixel values in the foreground map over a moving window of foreground maps; and
   the method further comprises integrating the foreground pixel values computing a weighted integration of the foreground pixel values for the given pixel over the moving window of foreground maps.

6. The method of claim 1, wherein processing the plurality of frames further comprises generating a difference map having difference pixel values identifying pixels of the given frame with pixel values different from corresponding pixel values of the pixels of a frame previous to the given frame.

7. The method of claim 6, wherein generating the difference map comprises:
   if a difference between a pixel value of a given pixel of the given frame and a corresponding pixel value of the frame previous to the given frame is greater than a second threshold, assigning a first difference pixel value to the given pixel; and
   otherwise, assigning a second difference pixel value to the given pixel.

8. The method of claim 1, wherein the temporal analysis comprises performing a running mean or a running variance of the time-series signal.

9. The method of claim 1, wherein performing temporal analysis comprises:
   computing a running mean of the time-series signal; and
   computing a finite difference of the running mean.

10. The method of claim 9, wherein performing temporal analysis comprises:
   computing a plurality of average values, wherein each average value is computed based on a window of values of the finite difference.

11. The method of claim 10, wherein performing temporal analysis comprises:
   if one or more ones of the plurality of average values in series is greater than a second threshold, determining occupancy; and
   otherwise, determining no occupancy.

12. The method of claim 1, wherein performing temporal analysis comprises:
   computing a running variance of the time-series signal; and
   computing a finite difference of the running variance.

13. The method of claim 12, wherein performing temporal analysis comprises:
   computing a plurality of average values, wherein each average value is computed based on a window of values of the finite difference.

14. The method of claim 13, wherein performing temporal analysis comprises:
   if one or more ones of the plurality of average values in series is greater than a second threshold, determining occupancy; and
   otherwise, determining no occupancy.

15. The method of claim 1, further comprising:
   in response to determining occupancy, triggering one or more classifiers for determining human presence in the one or more foreground areas.

16. A computer-readable non-transitory medium comprising one or more instructions for determining occupancy in a video stream, that when executed on a processor, configure the processor to:
   process a plurality of frames of the video stream, wherein for a given frame, processing comprises localizing one or more foreground areas in a foreground map and generating a motion map; wherein:
      localizing the one or more foreground areas in the foreground map comprises integrating, on a per pixel basis, foreground pixel values in the foreground map over a moving window of foreground maps, and
      integrating the foreground pixel values comprises computing, using a first order infinite impulse response filter, an integrated value for a given pixel based on a weighted sum of a previous integrated value and a present foreground pixel value for the given pixel;
   generate a time-series signal based on the localized one or more foreground areas and the motion map; and
   determine whether there is occupancy in the video stream based on temporal analysis of the time-series signal, wherein the temporal analysis determines whether peaks of the time-series signal are uncorrelated that indicates occupancy.

17. The computer-readable non-transitory medium of claim 16, wherein the temporal analysis comprises performing a running mean or a running variance of the time-series signal.

18. A method for determining occupancy in a video stream, comprising:
   processing a plurality of frames of the video stream, wherein for a given frame, processing comprises localizing one or more foreground areas in a foreground map and generating a motion map, wherein generating the motion map comprises accumulating, on a per pixel basis, difference pixel values over a moving window of difference maps, and summing motion pixel values of the motion map in the one or more foreground areas to generate a sample of a time-series signal;
   generating the time-series signal based on a plurality of samples of the time-series signal generated by the processing of the plurality of the frames of the video stream; and
   determining whether there is occupancy in the video stream based on temporal analysis of the time-series signal, wherein the temporal analysis determines whether peaks of the time-series signal are uncorrelated that indicates occupancy.

19. The method of claim 18, wherein generating the motion map further comprises:

if an accumulated value of difference pixel values for a given pixel over the moving window of difference maps is greater than a threshold, assigning a first motion pixel value to the given pixel; and otherwise, assigning a second motion pixel value to the given pixel.

20. The method of claim 18, wherein accumulating difference pixel values further comprises computing a sum of difference pixel values for a given pixel over the moving window of difference maps.

21. The method of claim 18, wherein localizing the one or more foreground areas comprises assigning a given pixel to a foreground area if an integrated value of foreground pixel values for the given pixel over a moving window of foreground maps is greater than a threshold.

22. The method of claim 18, wherein:
localizing the one or more foreground areas in the foreground map comprises integrating, on a per pixel basis, foreground pixel values in the foreground map over a moving window of foreground maps; and
integrating the foreground pixel values comprises computing a weighted integration of the foreground pixel values for a given pixel over the moving window of foreground maps.

23. A computer-readable non-transitory medium comprising one or more instructions for determining occupancy in a video stream, that when executed on a processor, configure the processor to:
process a plurality of frames of the video stream, wherein for a given frame, processing comprises localizing one or more foreground areas in a foreground map and generating a motion map;
generate a time-series signal based on the localized one or more foreground areas and the motion map; and
determine whether there is occupancy in the video stream based on temporal analysis of the time-series signal, wherein the temporal analysis determines whether peaks of the time-series signal are uncorrelated that indicates occupancy.

24. The computer-readable non-transitory medium of claim 23, wherein generating the motion map comprises accumulating, on a per pixel basis, difference pixel values over a moving window of difference maps.

25. The computer-readable non-transitory medium of claim 23, wherein the temporal analysis comprises performing a running mean or a running variance of the time-series signal.

* * * * *

UNITED STATES PATENT AND TRADEMARK OFFICE
CERTIFICATE OF CORRECTION

PATENT NO. : 10,372,977 B2  
APPLICATION NO. : 14/794991  
DATED : August 6, 2019  
INVENTOR(S) : Raka Singh Page 1 of 1

It is certified that error appears in the above-identified patent and that said Letters Patent is hereby corrected as shown below:

On the Title Page

The Assignee name (73), delete "GLOVAL" and insert -- "GLOBAL" --.

Signed and Sealed this
Seventeenth Day of September, 2019

Andrei Iancu
*Director of the United States Patent and Trademark Office*